(12) United States Patent
Yamano et al.

(10) Patent No.: US 10,850,763 B2
(45) Date of Patent: Dec. 1, 2020

(54) STEER-BY-WIRE STEERING SYSTEM

(71) Applicant: JTEKT CORPORATION, Osaka (JP)

(72) Inventors: Naoki Yamano, Okazaki (JP); Hidenori Itamoto, Tajimi (JP)

(73) Assignee: JTEKT CORPORATION, Osaka (JP)

( * ) Notice: Subject to any disclaimer, the term of this patent is extended or adjusted under 35 U.S.C. 154(b) by 149 days.

(21) Appl. No.: 15/867,119

(22) Filed: Jan. 10, 2018

(65) Prior Publication Data
US 2018/0201298 A1    Jul. 19, 2018

(30) Foreign Application Priority Data
Jan. 18, 2017    (JP) .................................. 2017-006878

(51) Int. Cl.
*B62D 5/00*    (2006.01)
*B62D 5/04*    (2006.01)
*B62D 6/00*    (2006.01)

(52) U.S. Cl.
CPC ............... *B62D 5/006* (2013.01); *B62D 5/04* (2013.01); *B62D 6/008* (2013.01)

(58) Field of Classification Search
None
See application file for complete search history.

(56) References Cited

U.S. PATENT DOCUMENTS

| 7,034,483 | B2 * | 4/2006 | Takahashi | B62D 5/006 318/139 |
| 2002/0059021 | A1 * | 5/2002 | Nishizaki | B62D 5/006 701/41 |
| 2004/0104066 | A1 | 6/2004 | Sakai | |
| 2004/0206569 | A1 * | 10/2004 | Kodama | B62D 5/008 180/402 |

(Continued)

FOREIGN PATENT DOCUMENTS

| EP | 1 205 371 | A2 | 5/2002 | |
| EP | 1205371 | A2 * | 5/2002 | ............ B62D 5/003 |

(Continued)

OTHER PUBLICATIONS

Jun. 14, 2018 Search Report issued in European Patent Application No. 18151575.0.

(Continued)

*Primary Examiner* — Shelley Chen
(74) *Attorney, Agent, or Firm* — Oliff PLC (57) ABSTRACT

The steer-by-wire steering system comprise a steering input device and a steering operation device that steers wheels which are mechanically coupleable. The steering input device includes a steering-side motor that supplies a steering shaft with a steering reaction force, the steering operation device includes a steered-side motor that supplies a rack shaft with a steering force, and a power supply control circuit that controls the steering-side motor to generate the steering reaction force and that controls the steered-side (Continued)

motor to generate the steering force. When the duty ratio of a duty signal that is generated to control the power supply to the steered-side motor reaches a setting value that is defined to indicate that a steered angle becomes unable to follow a steering angle, the power supply control circuit controls the power supply to the steering-side motor such that the steering-side motor increases the steering reaction force.

4 Claims, 4 Drawing Sheets

(56) References Cited

U.S. PATENT DOCUMENTS

2004/0211618 A1* 10/2004 Ogawa .................. B62D 6/008 180/402

2004/0238261 A1* 12/2004 Kodama ................ B62D 5/008 180/443
2005/0017664 A1* 1/2005 Takahashi ............. B62D 6/008 318/432

FOREIGN PATENT DOCUMENTS

| EP | 1 470 989 A2 | 10/2004 | |
|---|---|---|---|
| EP | 1470989 A2 * | 10/2004 | ............ B62D 6/008 |
| EP | 1 698 540 A1 | 9/2006 | |
| JP | 2002-087308 A | 3/2002 | |
| JP | 2004-130971 A | 4/2004 | |
| JP | 2004-359108 A | 12/2004 | |
| JP | 2012-144111 A | 8/2012 | |

OTHER PUBLICATIONS

Sep. 1, 2020 Office Action issued in Japanese Patent Application No. 2017-006878.

* cited by examiner

STEER-BY-WIRE STEERING SYSTEM

INCORPORATION BY REFERENCE

The disclosure of Japanese Patent Application No. 2017-006878 filed on Jan. 18, 2017 including the specification, drawings and abstract, is incorporated herein by reference in its entirety.

BACKGROUND OF THE INVENTION

1. Field of the Invention

The invention relates to a steer-by-wire steering system.

2. Description of Related Art

In a steer-by-wire steering system disclosed in Japanese Patent Application Publication No. 2012-144111 (JP 2012-144111 A), a steering wheel that is operated by a driver is mechanically isolated from steered wheels that are turned to the right or left in accordance with the operation by a driver. In the steer-by-wire steering system of JP 2012-144111 A, a reaction force generation motor is used to supply the steering wheel with a reaction force equivalent to a road reaction force, and first and second steering motors are used to generate power for turning the steered wheels to the right or left. The operation of these motors is controlled so that the power for turning the steered wheels to the right or left is generated in accordance with a steering angle that is detected on the basis of the operation of the steering wheel by a driver. Thus, the steered wheels are turned to the right or left in accordance with the steering angle.

The concern with the steer-by-wire steering system of JP 2012-144111 A is that when the steering angle changes sharply, for example, when a driver operates the steering wheel sharply, the steered wheels may become unable to follow the steering angle due to various factors including road surface conditions and motor performance limitations. This may make a driver feel a sense of discomfort.

SUMMARY OF THE INVENTION

A purpose of the invention is to provide a steer-by-wire steering system that is less likely to make a driver feel a sense of discomfort.

An aspect of the invention provides a steer-by-wire steering system where a steering input device that receives a steering input by being steered by a driver is mechanically coupleable to or isolated from a steering operation device that causes a steered wheel to be steered in accordance with the steering input to the steering input device by a driver, and the steer-by-wire steering system includes the following: a steering-side motor that supplies the steering input device with a steering reaction force that opposes the steering input to the steering input device by a driver; a steered-side motor that supplies the steering operation device with a steering force that causes the steered wheel to be steered; and a power supply control circuit that controls a power supply to the steering-side motor such that the steering-side motor generates the steering reaction force in accordance with the steering input to the steering input device by a driver and that controls a power supply to the steered-side motor such that the steered-side motor generates the steering force that causes a steered angle of the steered wheel to follow a steering angle that changes on the basis of the steering input to the steering input device by a driver, in which when a duty ratio of a duty signal that is generated to control the power supply to the steered-side motor reaches a setting value that is defined to indicate that the steered angle becomes unable to follow the steering angle, the power supply control circuit controls the power supply to the steering-side motor such that the steering-side motor increases the steering reaction force.

According to this aspect, when the steered-side motor encounters the situation where the steered angle becomes unable to follow the steering angle, the steering reaction force supplied to the steering input device increases. That is, a force that opposes the steering input by a driver increases, and accordingly, the rate of change in the steering angle that changes on the basis of the steering input decreases. This relatively increases followability that enables the steered angle to follow the steering angle, for example, when the steering angle changes sharply in response to a sharp steering operation by a driver, or when the steered angle becomes unable to follow the steering angle due to various factors including road surface conditions and motor performance limitations. Further, since the duty ratio is used as a common index to determine whether the steered-side motor encounters the situation where the steered angle becomes unable to follow the steering angle, it is possible to determine the state of the steered-side motor regardless of the performance of the steered-side motor. This reduces, regardless of the performance of the steered-side motor, the occurrence of the situation where the steered wheel becomes unable to follow the steering angle, thus making it less likely that a driver feels a sense of discomfort in the steer-by-wire steering system.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
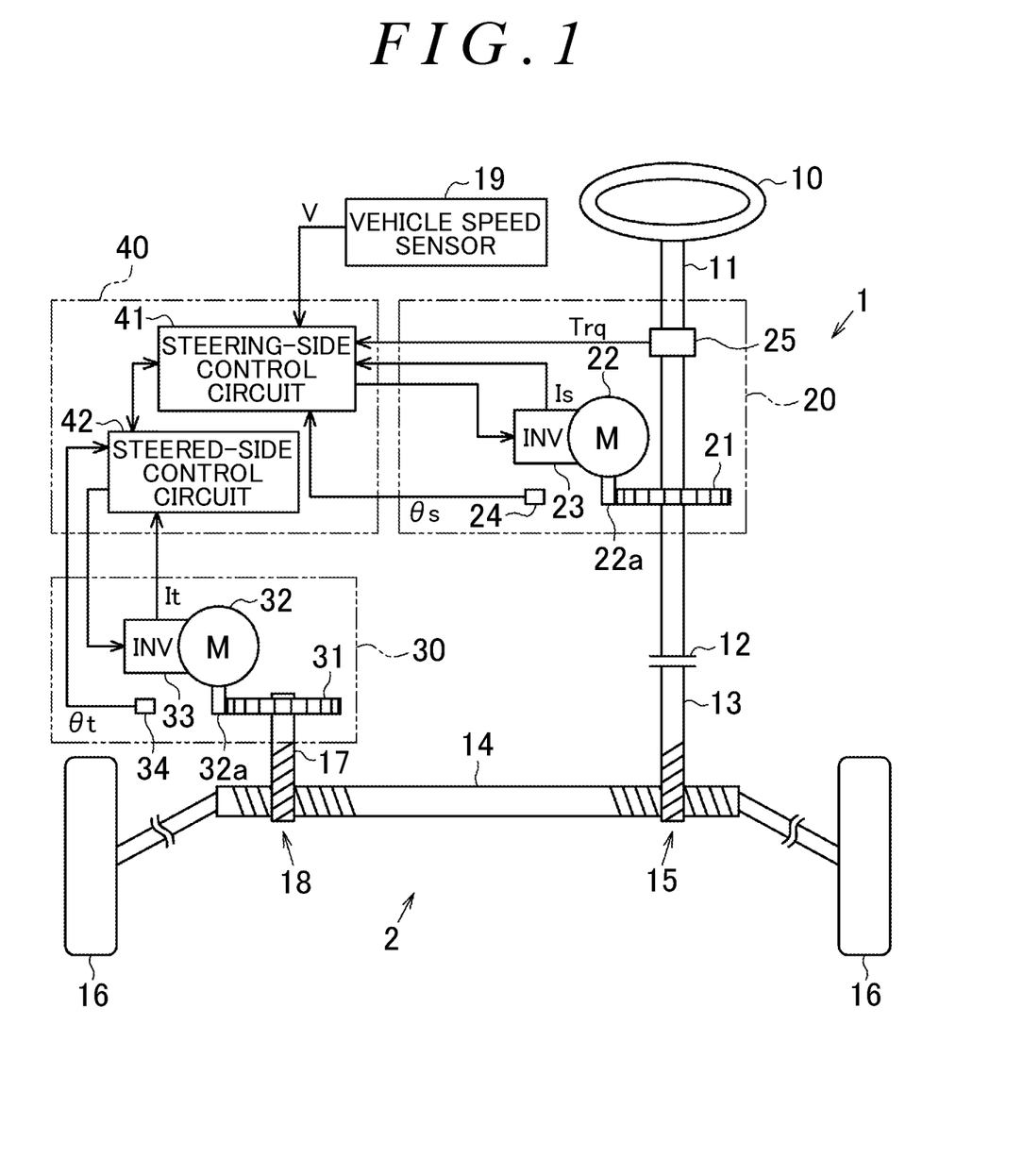
FIG. 1 is a diagram schematically illustrating a steer-by-wire steering system.

Below, a steer-by-wire steering system according to an embodiment of the invention is described. As illustrated in FIG. 1, the steer-by-wire steering system according to the embodiment includes a steering input device 1 having a steering wheel 10 that a driver steers, and a steering shaft 11 that the steering wheel 10 is fixed to. The steering shaft 11 is provided with a reaction force actuator 20 for supplying a steering reaction force that opposes the steering operation of the steering wheel 10 by a driver. The reaction force actuator 20 includes the following: a steering-side speed reducer 21 coupled to the steering shaft 11; a steering-side motor 22 having a rotating shaft 22a coupled to the steering-side speed reducer 21; and an inverter 23 for driving the steering-side motor 22. According to the embodiment, the steering-side motor 22 is a surface permanent magnet synchronous motor (SPMSM).

The steering shaft 11 is coupleable to and decoupleable from a steering operation device 2 via a clutch 12. The steering operation device 2 includes a pinion shaft 13 and a rack shaft 14 coupled to the pinion shaft 13. The pinion shaft 13 and the rack shaft 14 mesh with each other at a predetermined intersection angle, thus forming a first rack-and-pinion mechanism 15. Steered wheels 16 are coupled to different ends of the rack shaft 14 via tie rods.

The rack shaft 14 is provided, via a pinion shaft 17, with a steering actuator 30 for supplying a steering force that causes the steered wheels 16 to be steered. The steering actuator 30 includes the following: a steered-side speed reducer 31 coupled to the rack shaft 14; a steered-side motor 32 having a rotating shaft 32a coupled to the steered-side speed reducer 31; and an inverter 33 for driving the steered-side motor 32. For example, the steered-side motor 32 is a surface permanent magnet synchronous motor (SPMSM). The pinion shaft 17 and the rack shaft 14 mesh with each other at a predetermined intersection angle, thus forming a second rack-and-pinion mechanism 18.

The reaction force actuator 20 and the steering actuator 30 are connected to a power supply control circuit 40 that controls power supplies to (i.e., controls the drive of) the steering-side motor 22 and the steered-side motor 32. The power supply control circuit 40 includes a steering-side control circuit 41 that controls the power supply to the steering-side motor 22 such that the steering-side motor 22 generates the steering reaction force in accordance with the steering operation of the steering wheel 10 by a driver. The power supply control circuit 40 further includes a steered-side control circuit 42 that controls the power supply to the steered-side motor 32 such that the steered-side motor 32 generates the steering force in accordance with the steering operation by a driver. According to the embodiment, in normal times, the power supply control circuit 40 controls the power supplies to the steering-side motor 22 and the steered-side motor 32 with the clutch 12 disengaged, thus steering the steered wheels 16 in accordance with the steering operation by a driver.

At this time, the steering-side control circuit 41 receives a rotation angle θs of the rotating shaft 22a of the steering-side motor 22 that is detected by a steering-side sensor 24, and a steering torque Trq that is detected by a torque sensor 25 and that is a steering input exerted on the steering shaft 11 in accordance with the steering operation of the steering wheel 10 by a driver. The steering-side control circuit 41 further receives a vehicle speed V detected by a vehicle speed sensor 19 and an electric current Is resulting from a voltage drop across a non-illustrated shunt resistor connected to a source side of each switching element of the inverter 23. On the other hand, the steered-side control circuit 42 receives a rotation angle θt of the rotating shaft 32a of the steered-side motor 32 that is detected by a steered-side sensor 34. The steered-side control circuit 42 further receives an electric current It resulting from a voltage drop across a non-illustrated shunt resistor connected to a source side of each switching element of the inverter 33.

Specifically, each of the steering-side control circuit 41 and the steered-side control circuit 42 includes a central processing unit (CPU) and a memory, and the CPUs each executes a program stored in the memory to control the power supply to a corresponding one of the steering-side motor 22 and the steered-side motor 32.

Figure 2:
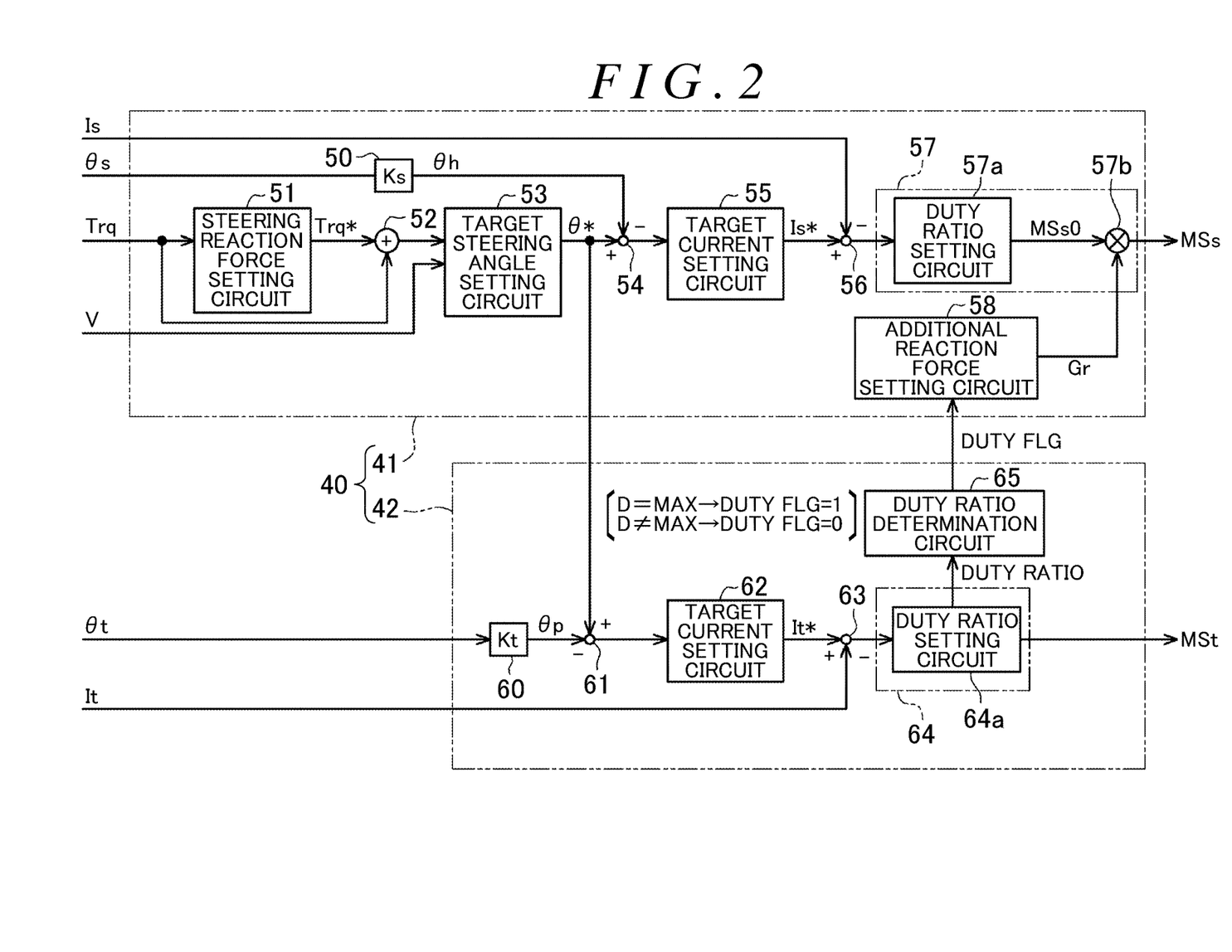
FIG. 2 is a block diagram illustrating an electrical structure of the steer-by-wire steering system and, in particular, illustrating functions of a steering-side control circuit and a steered-side control circuit.

FIG. 2 illustrates part of processes performed by the steering-side control circuit 41 and the steered-side control circuit 42. Specifically, FIG. 2 separately shows part of processes that are implemented when the CPU executes the program stored in the memory, according to types of the processes.

In the steering-side control circuit 41, the rotation angle θs detected by the steering-side sensor 24 is captured after being converted to a numerical value in an angle range wider than the range from zero to 360 degrees. In the steered-side control circuit 42, the rotation angle θt detected by the steered-side sensor 34 is captured after being converted to a numerical value in an angle range wider than the range from zero to 360 degrees.

In the steering-side control circuit 41, a conversion processing circuit 50 calculates a steering angle θh by multiplying the output value of the steering-side sensor 24 by a conversion factor Ks. The conversion factor Ks is set in accordance with a rotational speed ratio between the steering-side speed reducer 21 and the rotating shaft 22a of the steering-side motor 22. Thus, the rotation angle θs of the rotating shaft 22a is converted to a steering angle θh that is a rotation angle of the steering wheel 10. On the other hand, in the steered-side control circuit 42, a conversion processing circuit 60 calculates a steered angle θp by multiplying the output value of the steered-side sensor 34 by a conversion factor Kt. The conversion factor Kt is the product of the rotational speed ratio between the steered-side speed reducer 31 and the rotating shaft 32a of the steered-side motor 32 and a rotational speed ratio between the pinion shaft 17 and the pinion shaft 13. Thus, the rotation angle θt of the rotating shaft 32a is converted to a steered angle θp that is a rotation angle of the steering wheel 10 on the assumption that the clutch 12 is engaged.

In the processes illustrated in FIG. 2, the rotation angles θs and θt, the steering angle θh, and the steered angle θp are expressed as positive values in a predetermined direction of rotation and are expressed as negative values in a direction opposite to the predetermined direction. For example, when the rotating shafts 22a and 32a rotate in the direction opposite to the predetermined direction from their respective positions corresponding to the neutral position of the steering wheel 10, the steering-side control circuit 41 and the steered-side control circuit 42 output negative values. However, this is merely one example of the logic of a control system. In particular, according to this specification, as the amount of change from the neutral position is larger, the rotation angles θs and θt, the steering angle θh, and the steered angle θp are larger. In other words, as the amount of change from the neutral position is larger, absolute values of parameters, such as the angles described above, that can be either positive or negative are larger.

In the steering-side control circuit 41, a steering reaction force setting circuit 51 sets a steering reaction force command value Trq* on the basis of the steering torque Trq. The steering reaction force command value Trq* is set such that as the steering torque Trq is larger, the steering reaction force command value Trq* is larger. An adder circuit 52 produces an output value by adding the steering torque Trq to the steering reaction force command value Trq*.

A target steering angle setting circuit 53 sets a target steering angle θ* on the basis of the output value of the adder circuit 52. According to the embodiment, a model formula is used to associate the output value of the adder circuit 52 with the target steering angle θ*. The model formula defines an association between torque and rotation angle of a rotating shaft that rotates with rotation of the steering wheel 10, on the premise that the steering wheel 10 is mechanically coupled to the steered wheels 16. Further, the model formula has the following factors: a viscosity coefficient C that models the friction in the steering system; and an inertia coefficient J that models the inertia of the steering system. According to the embodiment, the viscosity coefficient C and the inertia coefficient J are variable and are set in accordance with the vehicle speed V.

A subtraction circuit 54 produces an output value by subtracting the steering angle θh from the target steering angle θ*. A target current setting circuit 55 sets a target current amount Is* on the basis of the output value of the subtraction circuit 54. The target current amount Is* is a controlled variable used to feedback-control the steering angle θh to the target steering angle θ* and is a target value of the amount of current corresponding to the steering reaction force generated by the steering-side motor 22. Specifically, the target current amount Is* is set to the sum of output values of an proportional element, an integral element, and a derivative element, each element receiving, as an input, a value that is calculated by subtracting the steering angle θh from the target steering angle θ*. A subtraction circuit 56 produces an output value by subtracting the current Is of the inverter 23 from the target current amount Is*.

A control signal generation circuit 57 calculates and outputs a control signal MSs on the basis of the output value of the subtraction circuit 56. The control signal MSs is a controlled variable used to feedback-control the current Is of the inverter 23 to the target current amount Is* and is, for example, a PWM signal that defines a duty ratio (Duty) of each of the switching elements of the inverter 23. Specifically, in the control signal generation circuit 57, a duty ratio setting circuit 57a calculates a voltage command value by feedback-controlling the current Is of the inverter 23 to the target current amount Is*. In the control signal generation circuit 57, the duty ratio setting circuit 57a calculates a duty signal corresponding to the calculated voltage command value. The control signal generation circuit 57 calculates a base signal MSs0 through comparison between the duty signal calculated by the duty ratio setting circuit 57a and a PWM carrier as a carrier wave, such as a triangle wave or a sawtooth wave. Further, in the control signal generation circuit 57, a multiplier circuit 57b calculates and outputs the control signal MSs by multiplying the base signal MSs0 by a reaction force gain Gr.

On the other hand, in the steered-side control circuit 42, a subtraction circuit 61 produces an output value by subtracting the steered angle θp from the target steering angle θ*. A target current setting circuit 62 sets a target current amount It* on the basis of the output value of the subtraction circuit 61. The target current amount It* is a controlled variable used to feedback-control the steered angle θp to the target steering angle θ* and is a target value of the amount of current corresponding to a steering force generated by the steered-side motor 32. Specifically, the target current amount It* is set to the sum of output values of an proportional element, an integral element, and a derivative element, each element receiving, as an input, a value that is calculated by subtracting the steered angle θp from the target steering angle θ*. A subtraction circuit 63 produces an output value by subtracting the current It of the inverter 33 from the target current amount It*. Since the steering angle θh is feedback-controlled to the target steering angle θ*, feedback-controlling the steered angle θp to the target steering angle θ* causes the steered angle θp to follow the steering angle θh.

In steer-by-wire steering systems such as the steer-by-wire steering system according to the embodiment, an increase in deviation between the steering angle θh and the steered angle θp causes a time lag in operation, for example, at the start of operation, between the steering wheel 10 steered by a driver and the steered wheels 16. This time lag makes a driver feel a sense of discomfort. The process in the target current setting circuit 62 allows a driver to avoid feeling such a sense of discomfort by feedback-controlling the steered angle θp to the target steering angle θ* so that the deviation between the steering angle θh and the steered angle θp is eliminated, i.e., so that the steering angle θh follows the steered angle θp.

A control signal generation circuit 64 calculates and outputs a control signal MSt on the basis of the output value of the subtraction circuit 63. The control signal MSt is a controlled variable used to feedback-control the current It of the inverter 33 to the target current amount It* and is, for example, a PWM signal that defines a duty ratio (Duty) of each of the switching elements of the inverter 33. Specifically, in the control signal generation circuit 64, a duty ratio setting circuit 64a calculates a voltage command value by feedback-controlling the current It of the inverter 33 to the target current amount It*. In the control signal generation circuit 64, the duty ratio setting circuit 64a calculates a duty signal corresponding to the calculated voltage command value. Then, the control signal generation circuit 64 calculates the control signal MSt through comparison between the duty signal calculated by the duty ratio setting circuit 64a and a PWM carrier as a carrier wave, such as a triangle wave or a sawtooth wave.

In the steered-side control circuit 42, a duty ratio determination circuit 65 determines the state of the steered-side motor 32 on the basis of a duty ratio D of the duty signal calculated by the duty ratio setting circuit 64a, and sets and outputs a duty flag FLG as information indicating a result of the determination. Specifically, when the duty ratio D has the maximum value (MAX) of 100% (D=MAX), i.e., when the steered-side motor 32 already reaches a limit state, the duty ratio determination circuit 65 sets and outputs a value of "1" indicating that the steered-side motor 32 is in the limit state (duty flag FLG="1"). In contrast, when the duty ratio D does not have the maximum value (MAX) (D≠MAX), i.e., when the steered-side motor 32 does not reach the limit state yet, the duty ratio determination circuit 65 sets and outputs a value of "zero" indicating that the steered-side motor 32 is not in the limit state (duty flag FLG="zero"). For example, the situation where the steered-side motor 32 is in the limit state corresponds to a situation where the steered angle θp is unable to follow the steering angle θh. The steered-side motor 32 falls into the limit state due to various factors including road surface conditions and motor performance limitations. It is noted that 100% that is the maximum value of the duty ratio D is one example of a setting value that is defined to indicate that the steered angle θp becomes unable to follow the steering angle θh.

In the steering-side control circuit 41, an additional reaction force setting circuit 58 sets the reaction force gain Gr on the basis of the duty flag FLG that is an output value of the duty ratio determination circuit 65, thereby setting an increase in the steering reaction force. This setting is intended to relatively increase followability that enables the steered angle θp to follow the steering angle θh, for example, when the steered-side motor 32 encounters a situation where the steering angle θh changes sharply in response to a sharp steering operation by a driver, or when the steered angle θp becomes unable to follow the steering angle θh due to various factors including road surface conditions and motor performance limitations. The details of this setting are described below.

Figure 3:
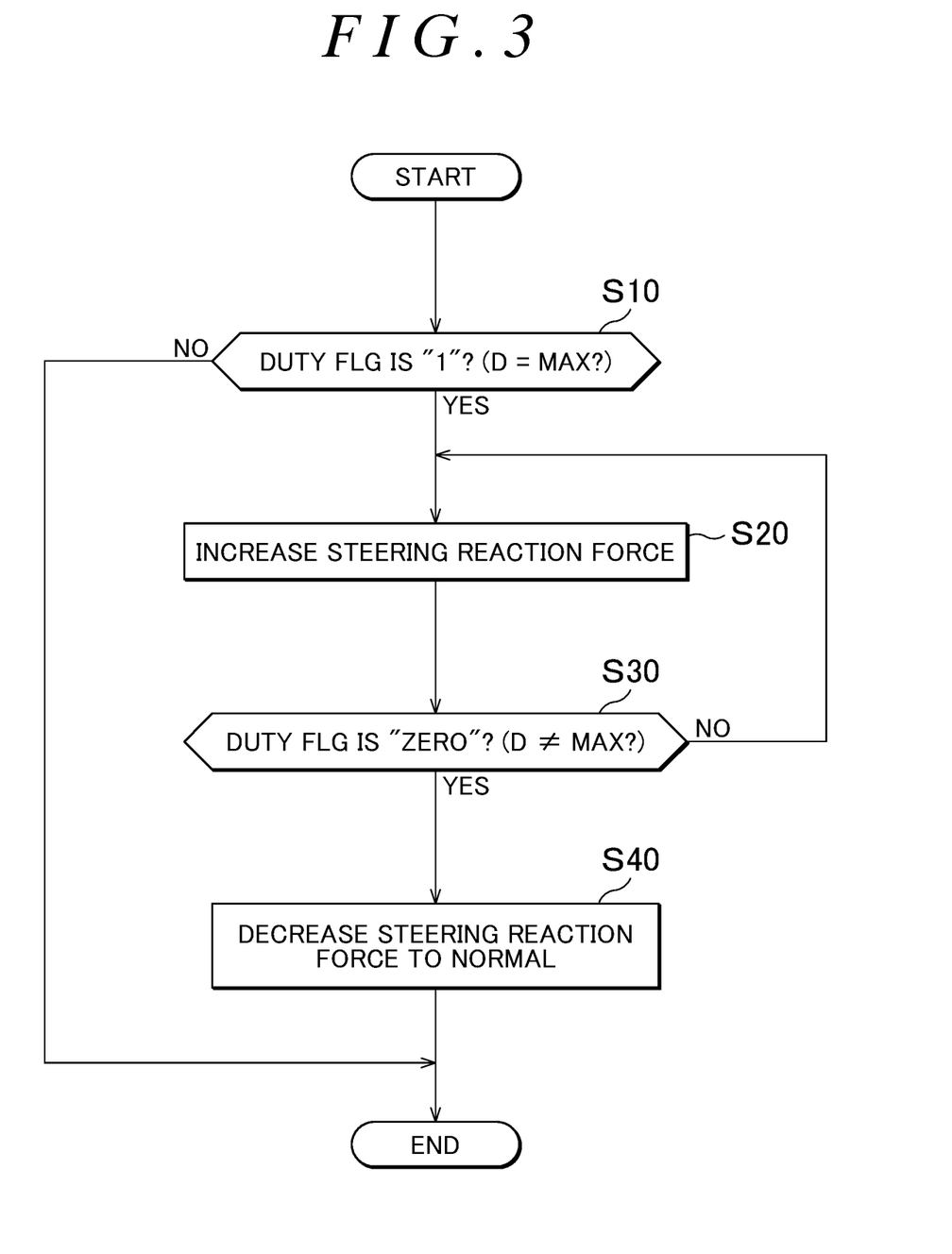
FIG. 3 is a flowchart illustrating a process executed by an additional reaction force setting circuit of the steering-side control circuit.

FIG. 3 illustrates the process in the additional reaction force setting circuit 58. In the steering-side control circuit 41, the CPU periodically and repeatedly executes the program stored in the memory, thus performing the process illustrated in FIG. 3.

In the process illustrated in FIG. 3, the additional reaction force setting circuit 58 first determines whether the duty flag FLG outputted by the duty ratio determination circuit 65 is "1" (D=MAX) (step S10). This step is used to determine whether the steered-side motor 32 is in the limit state. If determining that the duty flag FLG is "zero" (corresponding to NO in step S10), the additional reaction force setting circuit 58 temporarily terminates the process illustrated in FIG. 3.

Figure 4A:
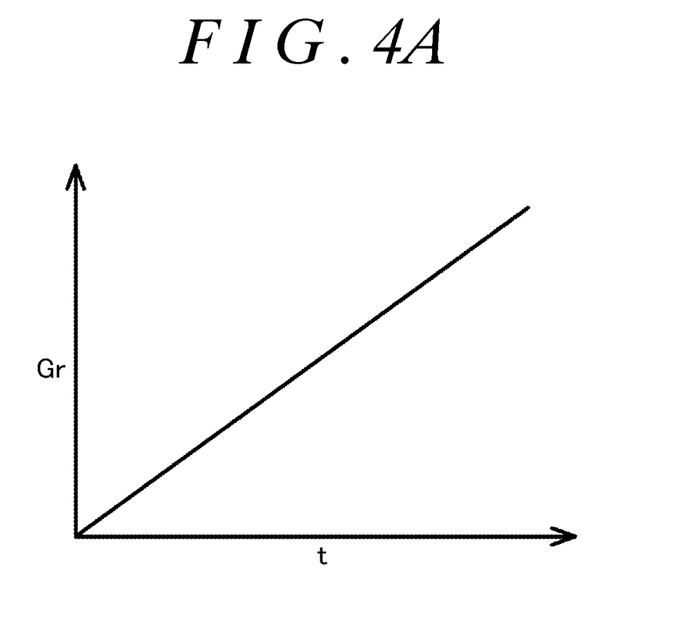
FIG. 4A is a diagram illustrating a first relationship between an elapsed time and a reaction force gain.

In contrast, if determining that the duty flag FLG is "1" (corresponding to YES in step S10), the additional reaction force setting circuit 58 increases the steering reaction force (step S20). The additional reaction force setting circuit 58 has a first map that is illustrated in FIG. 4A and that defines a first relationship between the reaction force gain Gr and an elapsed time t. The first map sets the reaction force gain Gr such that as the elapsed time t increases, the reaction force gain Gr increases. The additional reaction force setting circuit 58 normally sets the reaction force gain Gr to one. When the steered-side motor 32 is in the limit state, the additional reaction force setting circuit 58 gradually increases the reaction force gain Gr in a range not less than one through the procedure in step S20. Thus, the steering reaction force gradually increases with the gradual increase in the reaction force gain Gr. If the reaction force gain Gr is one, the control signal MSs that is the same as the base signal MSs0 calculated by the control signal generation circuit 57 is outputted. In contrast, if the reaction force gain Gr is not less than one, the control signal MSs that has more reaction force than the base signal MSs0 calculated by the control signal generation circuit 57 is outputted.

Next, the additional reaction force setting circuit 58 determines whether the duty flag FLG outputted by the duty ratio determination circuit 65 is "zero" (D≠MAX) (step S30). This step is used to determine whether the steered-side motor 32 already comes out of the limit state. If determining that the duty flag FLG is "1" (corresponding to NO in step S30), the additional reaction force setting circuit 58 returns to step S20 and repeats steps S20 and S30 as long as the duty flag FLG is "1".

Figure 4B:
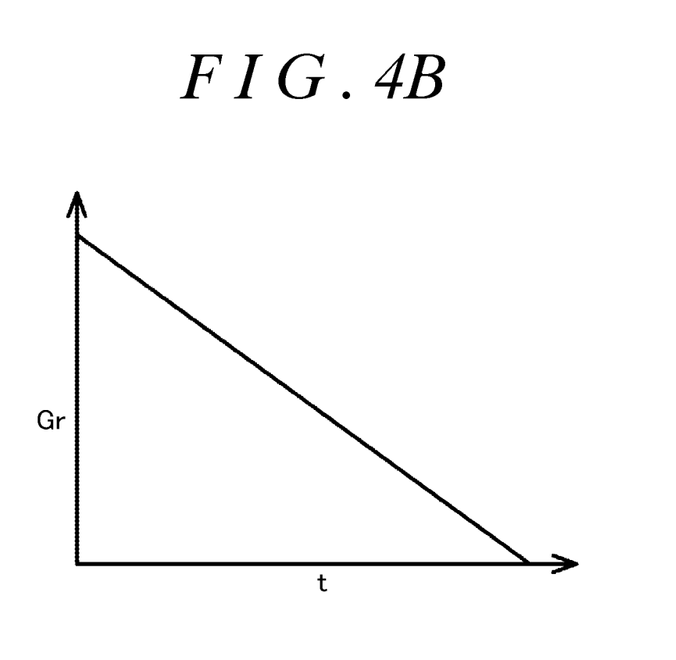
FIG. 4B is a diagram illustrating a second relationship between the elapsed time and the reaction force gain.

In contrast, if determining that the duty flag FLG is "zero" (corresponding to YES in step S30), the additional reaction force setting circuit 58 decreases the steering reaction force to a normal value (step S40). The additional reaction force setting circuit 58 has a second map that is illustrated in FIG. 4B and that defines a second relationship between the reaction force gain Gr and the elapsed time t. The second map sets the reaction force gain Gr such that as the elapsed time t increases, the reaction force gain Gr decreases. When the steered-side motor 32 already comes out of the limit state, the additional reaction force setting circuit 58 gradually decreases, to a normal value of one through the procedure in step S40, the reaction force gain Gr that has been set to a value not less than one through the procedure in step S20. Thus, the steering reaction force gradually decreases with the gradual decrease in the reaction force gain Gr. If the direction of the steering reaction force changes (from positive to negative, or from negative to positive) while the reaction force gain Gr is decreased toward the normal value of one through the procedure in step S40, the additional reaction force setting circuit 58 sets the reaction force gain Gr to the normal value of one. After setting the reaction force gain Gr to the normal value of one, the additional reaction force setting circuit 58 temporarily terminates the process illustrated in FIG. 3.

The effects and advantages of the embodiment are described below.

(1) According to the embodiment, when the steered-side motor 32 encounters a situation where the steered angle θp becomes unable to follow the steering angle θh, the steering reaction force supplied to the steering shaft 11 increases. Thus, a force that opposes the steering torque Trq by a driver increases, and accordingly, the rate of change in the steering angle θh that changes on the basis of the steering torque Trq decreases. This relatively increases followability that enables the steered angle θp to follow the steering angle θh, for example, when the steering angle θh changes sharply in response to a sharp steering operation by a driver, or when the steered angle θp becomes unable to follow the steering angle θh due to various factors including road surface conditions and motor performance limitations. Further, since the duty ratio D is used as a common index to determine whether the steered-side motor 32 encounters the situation where the steered angle θp becomes unable to follow the steering angle θh, it is possible to determine the state of the steered-side motor 32 regardless of the performance of the steered-side motor 32. This reduces, regardless of the performance of the steered-side motor 32, the occurrence of a situation where the steered wheels 16 become unable to follow the steering angle θh, thus making it less likely that the steer-by-wire steering system makes a driver feel a sense of discomfort.

(2) According to the embodiment, when the steered-side motor 32 is in the limit state, the additional reaction force setting circuit 58 gradually increases the reaction force gain Gr in a range not less than one through the procedure in step S20. Thus, the occurrence of a sharp change in the steering reaction force is reduced while the steering reaction force is increased. This makes it less likely that a driver feels a sense of discomfort when the steering reaction force is supplied in order to reduce, regardless of the performance of the steered-side motor 32, the occurrence of the situation where the steered wheels 16 become unable to follow the steering angle θh.

(3) According to the embodiment, when the steered-side motor 32 comes out of the limit state after the reaction force gain Gr has been increased in the range not less than one through the procedure in step S20 based on the fact that the steered-side motor 32 is in the limit state, the additional reaction force setting circuit 58 decreases the increased reaction force gain Gr. In this case, the additional reaction force setting circuit 58 gradually decreases the reaction force gain Gr to the normal value of one through the procedure in step S40. Thus, the occurrence of a sharp change in the steering reaction force is reduced while the steering reaction force is decreased. This makes it less likely that a driver feels a sense of discomfort after the steering reaction force has been supplied in order to reduce, regardless of the performance of the steered-side motor 32, the occurrence of the situation where the steered wheels 16 become unable to follow the steering angle θh.

(4) According to the embodiment, the additional reaction force setting circuit 58 uses the duty ratio D to determine the state of the steered-side motor 32 through the procedure in step S10 and, in particular, determines that the steered-side motor 32 is in the limit state when the duty ratio D is the maximum value of 100%. This makes it possible to properly determine that the steered-side motor 32 is in the limit state. It is noted that the situation where the steered-side motor 32 is in the limit state corresponds to the situation where the steered angle θp becomes unable to follow the steering angle θh due to various factors including road surface conditions and motor performance limitations. Further, the setting value that is set to 100% that is the maximum value of the duty ratio D is usable commonly regardless of the performance of the steered-side motor 32. Accordingly, it is possible to determine, with the same accuracy regardless of the performance of the steered-side motor, the situation where the steered angle θp becomes unable to follow the steering angle θh. Thus, regardless of the performance of the steered-side motor 32, it is possible to satisfactorily reduce the occurrence of the situation where the steered wheels 16 become unable to follow the steering angle θh.

The embodiment can be modified in various ways, for example, as follows. The duty ratio determination circuit 65 may determine that the steered-side motor 32 is in the limit state when the duty ratio D is close to the maximum value, for example, in a range from 95% to 100% inclusive. In other words, the duty ratio determination circuit 65 may determine that the steered-side motor 32 is in the limit state, on the basis of a setting value that has a predetermined range. Whether there is a possibility that the steered-side motor 32 reaches the limit state may be determined, and if the possibility exists, the steering reaction force may be increased. In this case, the duty flag FLG may be set to "1" so that the steering reaction force is increased, when the duty ratio D is less than the maximum value, for example, when the duty ratio D is not less than 80%. Thus, the setting range of the duty ratio D may be optimized in accordance with the operating environments and applications of a steer-by-wire steering system.

When the steered-side motor 32 comes out of the limit state (corresponding to YES in step S30), the additional reaction force setting circuit 58 may set, to the normal value of one, the reaction force gain Gr that has been set to a value not less than one in step S20. In this case, the process illustrated in FIG. 3 may be temporarily terminated when the steered-side motor 32 comes out of the limit state.

How the reaction force gain Gr increases and decreases with the elapsed time t may vary. For example, the reaction force gain Gr may increase and decrease with a gradient larger than that of the embodiment. The gradient may remain small until the elapsed time t exceeds a predetermined threshold time and may sharply increase when the elapsed time t exceeds the threshold time. The reaction force gain Gr may increase and decrease with different gradients. The reaction force gain Gr may change in accordance with parameters, such as the vehicle speed V, other than the elapsed time t. In particular, the reaction force gain Gr may decrease in accordance with the following parameters: a steering speed that is the rate of change in the steering angle θh; a steered speed that is the rate of change in the steered angle θp; and an angular velocity (i.e., a so-called yaw rate) around a vertical axis passing through the center of gravity of a vehicle. In this case, a steering feeling can be adjusted, by reducing the decreasing gradient when the steering speed is relatively small, for example. This improves the flexibility in adjusting the steering feeling.

The steering reaction force may be increased without using the map, and many be increased by increasing the reaction force gain Gr by a predetermined value in each control cycle. Further, the steering reaction force may be increased without using the reaction force gain Gr, and may be increased by increasing the target current amount or the control signal in accordance with the amount that the steering reaction force is to be increased by. These alternative approaches may be used to decrease the steering reaction force.

The steering reaction force command value Trq* may be set using at least the steering torque Trq, without using the vehicle speed V. Alternatively, the steering reaction force command value Trq* may be set using other elements in addition to the steering torque Trq and the vehicle speed V.

The additional reaction force setting circuit 58 of the steering-side control circuit 41 may determine the state of the steered-side motor 32 by capturing the duty signal (the duty ratio D) that has been calculated by the duty ratio setting circuit 64a of the steered-side control circuit 42. This approach eliminates the need to use the duty ratio determination circuit 65 (the duty flag FLG) of the steered-side control circuit 42. Further, the duty ratio setting circuit 64a of the steered-side control circuit 42 may control increasing and decreasing changes in the steering reaction force by setting the reaction force gain Gr. This approach eliminates the need to use the additional reaction force setting circuit 58 of the steering-side control circuit 41.

The steering-side control circuit 41 and the steered-side control circuit 42 may be either separate control units or may constitute a single control circuit within the power supply control circuit 40.

The steering angle θh may be detected by a steering angle sensor mounted to the steering shaft 11. The steered angle θp may be detected by a steered angle sensor mounted to the pinion shaft 13.

The model formula used in the target steering angle setting circuit 53 may further have a so-called spring term with a spring coefficient K that is determined in accordance with the specifications of suspension, wheel alignment, etc.

The steering-side motor 22 and the steered-side motor 32 are not limited to a SPMSM and may be, for example, an interior permanent magnet synchronous motor (IPMSM). The embodiment may be applied to a steer-by-wire steering system that does not have the clutch 12 so that the steering shaft 11 is isolated from the steering operation device 2. In this case, the pinion shaft 13 is unnecessary.

The steering actuator 30 may be a rack assist type other than that described in the embodiment. For example, the steered-side motor 32 may be disposed on the same axis with the rack shaft 14, or the steered-side motor 32 may be disposed parallel to the rack shaft 14.

The modifications may be combined with each other. For example, one modification where the steering actuator 30 is structured such that the steered-side motor 32 is disposed on the same axis with the rack shaft 14 may be combined with any of the other modifications.

What is claimed is:

1. A steer-by-wire steering system where a steering input device that receives a steering input by being steered by a driver is mechanically coupleable to or isolated from a steering operation device that causes a steered wheel to be steered in accordance with the steering input to the steering input device by the driver, the steer-by-wire steering system comprising:
    a steering-side motor that supplies the steering input device with a steering reaction force that opposes the steering input to the steering input device by the driver;
    a steered-side motor that supplies the steering operation device with a steering force that causes the steered wheel to be steered; and a power supply control circuit that controls a power supply to the steering-side motor such that the steering-side motor generates the steering reaction force in accordance with the steering input to the steering input device by the driver and that controls a power supply to the steered-side motor such that the steered-side motor generates the steering force that causes a steered angle of the steered wheel to follow a steering angle that changes on a basis of the steering input to the steering input device by the driver, wherein in response to determining that a duty ratio of a duty signal that is generated to control the power supply to the steered-side motor has reached a setting value that is predetermined to indicate that the steered angle becomes unable to follow the steering angle, the power supply control circuit controls the power supply to the steering-side motor such that the steering-side motor increases the steering reaction force.

2. The steer-by-wire steering system according to claim 1, wherein in response to determining that the duty ratio of the duty signal generated to control the power supply to the steered-side motor has reached the setting value, the power supply control circuit controls the power supply to the steering-side motor such that the steering-side motor gradually increases the steering reaction force.

3. The steer-by-wire steering system according to claim 2, wherein in response to determining that the duty ratio of the duty signal generated to control the power supply to the steered-side motor has become less than the setting value after the steering reaction force was increased because the duty ratio of the duty signal generated to control the power supply to the steered-side motor reached the setting value, the power supply control circuit controls the power supply to the steering-side motor such that the steering-side motor gradually decreases the steering reaction force.

4. The steer-by-wire steering system according to claim 1, wherein the setting value is set to a maximum value of the duty ratio that is outputtable in the power supply control circuit.

* * * * *